Patented Feb. 6, 1934

1,946,055

UNITED STATES PATENT OFFICE 1,946,055

PIGMENT

Julian T. Baldwin, West Chester, Pa., assignor to Sandura Company, Inc., Paulsboro, N. J., a corporation of New Jersey No Drawing. Application October 21, 1932
Serial No. 638,994

11 Claims. (Cl. 134—58)

This invention relates to improvements in the manufacture of pigments.

Among other features of the invention it is desired to so modify the surface energy characteristics of ordinary pigments as to give these pigments greatly improved qualities not hitherto attainable.

The present application is in part a continuation of my copending application Serial No. 484,937, filed September 27, 1930, and Serial No. 587,453, filed January 18, 1932. The present invention relates to pigment products obtained in processes described in these applications.

Heretofore the qualities of pigments have depended largely on the materials from which the pigments have been made, and on the manner of making them. By the process of the present invention, on the other hand, any kind of pigment, no matter how it has been made, may be treated by a process entirely separate from and independent of its own manufacture, whereby its qualities become greatly improved.

Some of the advantages of the pigment products of the present invention are:

1. Better color tone;
2. Greater ease of dispersion;
3. Control of yield value in plastic systems;
4. Better adhesion between pigment and binder or vehicle;
5. Better distribution of particle size;
6. Greater abrasion resistance and tensile strength of their plastics;
7. Smoother and glossier paints and plastics; and
8. Easy removal of moisture.

The surface energy characteristics of pigments play an important part in determining the properties of the pigment when in contact with a binding medium. Settling, cohesion, flocculation, gloss, weathering and abrasion resistance are all functions of the surface energy characteristics. Thus a lead paint on exposure chalks while a zinc oxide paint fails by cracking largely due to the different surface energy characteristics of the two pigments.

Pigments may have their surface energy characteristics greatly modified by coating their surfaces with a thin film of certain organic compounds. However it is very necessary that the material used for coating the pigment remain at the pigment binder interface if it is to have the desired effect. If the material is removed by the binding agent from the interface as would be an ordinary resin if it were used for coating, its effect would only be the same as if the same amount of resin was originally dissolved in the oil or binding medium. Or if the pigment were coated with an oil and the oil subsequently oxidized, the adhesion between the pigment and the oil in a paint would be very much the same as if the oil had been added to the pigment in the usual manner. This is, the interface would be between oil and pigment whether the pigment was added to the oil all at once or if the surface of pigment had been covered with oil which was then oxidized and the resulting coated pigment added to the main body of oil to form the paint.

I have found however that the most desirable and permanent modification of the surface energy characteristics is obtained by causing precipitated suspensions of water repellent metallic organic compounds to become adherent upon the surface of the pigment in the form of a thin film covering each pigment particle. In the first place, the most desirable metallic organic compounds as zinc stearate, calcium oleate or aluminum stearate or resinate are insoluble in water and water repellent. And then it does not seem advisable to coat a pigment with a water soluble coating that is permanent since this would greatly destroy the waterproofing qualities of the paint film, linoleum or rubber product. In order to reduce the tendency for these metallic compounds to be removed from the pigment binder interface it is sometimes advisable to precipitate glue or calcium caseinate in conjunction with them. These materials are rendered insoluble in water to secure their precipitation. The coating material is always of different derivation from the pigment itself, being formed by a process entirely separate and independent from the process of chemical formation of the pigment.

Various methods of manufacturing my pigment products may be employed. One general method, as set forth in my application Serial No. 484,937, is to place the pigment in a revolving tube heated to a relatively high temperature and to introduce into such tube hot fatty acid vapors or preferably vapors of oxidized organic or fatty material. After allowing the hot vapors to contact with the pigment for a suitable length of time, it is preferable to cut off the supply of vapors and to introduce unheated air while the contents of the tube are cooled. Preferably, fatty acid vapors arising from the distillation of vegetable oil material are employed, though others such as animal oil or fatty material may be used.

Other methods of contacting fatty acid vapors with pigment may also be employed, such as introducing the vapors upwardly through screens containing the pigment, and other well-known methods for causing intimate contact between solids and gases or vapors.

A specific example of a process for preparing a coated pigment is as follows:

Into a revolving tube containing lithopone, said tube and contents being at a temperature of 550° F. are introduced the vapors from the distillation of soya bean oil as such, or preferably blown soya bean oil at a temperature between 510° and 540° F. After the vapors have contacted with the pigment for from ten minutes to an hour, the vapors are cut off and unheated air is introduced slowly while the contents of the tube are cooled to 500° F. This temperature is maintained for half an hour, and the pigment after cooling is ready for shipment. Distillation of the oil may be accomplished by using superheated steam at temperatures from 400° F. to 650° F. and drawing the gases from the pigment tube into a condenser. In this case the pigment may be kept slightly above the temperature of the entering vapors. To avoid the formation of decomposition products during distillation it is desirable in many cases to use fatty acids instead of their glycerides (natural oils). Using a high vacuum is another method of reducing the amount of decomposition. Still another method is that of bubbling a gas through the oil or fatty acid. Suitable gases are carbon dioxide, nitrogen, air and oxygen. In using air it is advisable to avoid temperatures above 625° F. due to the danger of combustion and explosion. With oxygen even lower temperatures should be used for the same reasons. Soya bean oil does not completely distill below 540, and in fact is only half distilled at 620° F. The distillation range of vegetable oils extends over a wide temperature range. Excess of condensed fatty acid may be removed by heating the pigment to 590° F. for five to ten minutes.

The purpose of this procedure is to absorb the organic acid vapors on the surface of the pigment, then lower the temperature of the pigment so that the vapors condense, then maintain a temperature slightly below the condensation point until the organic acid has formed a metallic compound through reaction with the pigment. The time required depends on the reactivity and surface of the pigment. Thus zinc oxide requires a very much shorter time than the lithopone, since the zinc oxide reaction is instantaneous. In the case of the more active pigments, as zinc oxide, it is generally desirable to carry out the reaction without condensing the acids on the pigment. That is the acids react with sufficient rapidity with the pigment while the acids are in the vapor phase. By heating to 590° F. again, excess acid and decomposition products of the oil vapors are removed.

The advantage of the above procedure is to avoid contamination of the pigment with substances other than the desired soap. In the example the linoleic and other fatty acids come in direct contact with the pigment and act directly upon it, thus precluding any impurities.

Oxidized fatty acids are prepared by saponifying "scrim oil" with lye or alcoholic potash and acidifying with hydrochloric acid. The resulting mixture is agitated with petroleum ether. The oxidized fatty acids then collect as sediment in the petroleum ether layer, or adhere to the sides of the vessel.

The soap formed from "scrim oil", which contains generally 50-65% oxidized fatty acids, will do satisfactorily in place of the soap made from the purified fatty acids.

Besides "scrim oil" made from linseed oil, "scrim oil" made from China wood oil, or other drying or semi-drying vegetable oil may be used. Other processes besides the "scrim" process may be used to secure the required oxidation of the oil.

Another general method of manufacturing my pigment products comprises placing pigment material in an aqueous suspension containing a potassium or sodium salt of preferably oxidized organic acid water-dispersable material in such quantities as to form an insoluble soap on the pigment preferably in the proportion of about 0.2% to 2% of the weight of the pigment introduced. This suspension of pigment is well mixed or may be ground in a colloid mill. Then is added the precipitating agent, a metallic salt, in a proportion to cause the precipitation of a suspension of the water repellent metallic organic compound formed by the reaction of the precipitating agent with the dissolved or dispersed organic compound.

The proportion of pigment to coating agent depends on the specific surface of the pigment. The larger the specific surface the larger is the amount of coating agent required to cover the surface. Various fillers and pigments besides zinc oxide and lithopone, including for example, whiting, titanium, pigment, red slate flour, and titanium calcium pigment, are provided with insoluble soap coatings.

A further example of a process for preparing a coated pigment is as follows:

A pigment or filler is suspended in an aqueous medium and to the suspension is added a water-soluble soap of an oxidized fatty acid such as oxidized linoleic acid for instance. The mixture is agitated or ground in a colloid mill. Then a solution of a zinc salt such as zinc sulphate or chloride is added. Other compounds of the type including, for instance, ferric chloride and barium hydroxide, which will react with the water-soluble soap to form a water-insoluble soap may be employed. The water-soluble soap and the salt solution or precipitating agent are so proportioned that the film formed on the pigment is about 0.2% to 2% of the weight of the pigment. The resulting material is agitated thoroughly or ground in a colloid mill. The pigment is allowed to settle, is washed, filtered and dried according to the usual practice, and the pigment having on its surface a thin film comprising a soap of an oxidized fatty acid is ready for use.

It has been found that the soaps of the oxidized fatty acids containing more than seven carbon atoms in the chain found in various oils are particularly well adapted for use as coatings for pigment or filler particles. This is because they are much less soluble in paint vehicles than soaps made from the usual unoxidized acids. Also, these soaps may be polymerized, or made from polymerized oxidized fatty acids. That is, they may be polymerized either after they are made, or the oxidized fatty acid may be polymerized and then made into soap. Pigments coated with the soaps made from these oxidized fatty acids will retain their coating indefinitely, while if pigments are coated with the soaps of the unoxidized fatty acids, this coating is somewhat unstable and liable to be dissolved in the paint vehicle.

Other organic acids such as resin acids and preferably oxidized resin acids which produce water-insoluble or oil-insoluble salts with such metals as calcium, zinc, aluminum, barium, and magnesium may be used in obtaining my improved pigment. When employing resin acids in the vapor treatment process, it is preferable to vaporize them at temperatures below their decomposition temperatures and in vacuum.

Methods of applying soaps as a coating to pigments by precipitating the soap upon the pigment from an aqueous medium containing the pigment in suspension have been set forth in detail in my copending application, Serial No. 587,453 filed January 18, 1932.

Wherever the term "pigment" appears in the specification and claims, it is meant to include not only pigment as technically considered, but also all varieties of particles including fillers and other materials of similar nature. Likewise, wherever the word "film" appears in the specification and claims, it is meant to include a group of very small particles of the water-repellent compound contained or carried on the surface of the pigment.

I claim:

1. As a product of manufacture, a pulverulent pigment having an adherent water repellent coating on its surface, said coating comprising a soap of an oxidized fatty acid having more than seven carbon atoms in the chain.

2. As a product of manufacture, a pulverulent pigment having an adherent water repellent coating on its surface, said coating comprising a zinc salt of oxidized fatty acid having more than seven carbon atoms in the chain.

3. As a product of manufacture, a pulverulent pigment having an adherent water repellent coating on its surface, said coating comprising a zinc salt of oxidized linoleic acid.

4. As a product of manufacture, a pulverulent pigment including available reactive zinc the surface of particles in said product containing a water repellent zinc soap of an oxidized fatty acid in the form of a film covering the said particles and adhering thereto, the said fatty acid having more than seven carbon atoms in the chain.

5. As a product of manufacture, a pulverulent pigment including particles having a central portion comprising a metal compound adapted to react with fatty acids to form soap, and an outer film of a soap of the said metal and oxidized fatty acid adhering to the said central portion, the said fatty acid having more than seven carbon atoms in the chain.

6. As a product of manufacture, a pulverulent pigment having modified surface energy characteristics, said pigment having an adherent thin surface coating comprising a soap of an oxidized fatty acid derived from a vegetable oil, the said fatty acid having more than seven carbon atoms in the chain.

7. As a product of manufacture, a pulverulent pigment having modified surface energy characteristics, said pigment having an adherent thin surface coating comprising a polymerized soap of an oxidized fatty acid having more than seven carbon atoms in the chain.

8. As a product of manufacture, a pulverulent pigment having modified surface energy characteristics, said pigment having an adherent thin surface coating comprising a soap of a polymerized oxidized fatty acid having more than seven carbon atoms in the chain.

9. As a product of manufacture, a pulverulent pigment having modified surface energy characteristics, said pigment having an adherent thin surface coating comprising a soap derived from scrim oil.

10. As a product of manufacture, a pulverulent pigment, the surfaces of the particles of which contain a water-repellent soap of an oxidized fatty acid in the form of a thin film covering the particles and adhering thereto, the said fatty acid having more than seven carbon atoms in the chain and the soap remaining at pigment-binder interface after the addition of a binder.

11. As a product of manufacture, a pulverulent pigment having an adherent coating on its surface comprising a water-insoluble salt of an oxidized organic acid selected from a group consisting of oxidized fatty acids having more than seven carbon atoms in the chain, and oxidized resin acids.

JULIAN T. BALDWIN.